W. B. McLAUGHLIN.
METHOD OF PRODUCING FOODSTUFFS.
APPLICATION FILED OCT. 17, 1917. RENEWED NOV. 5, 1920.
1,380,489.  Patented June 7, 1921.
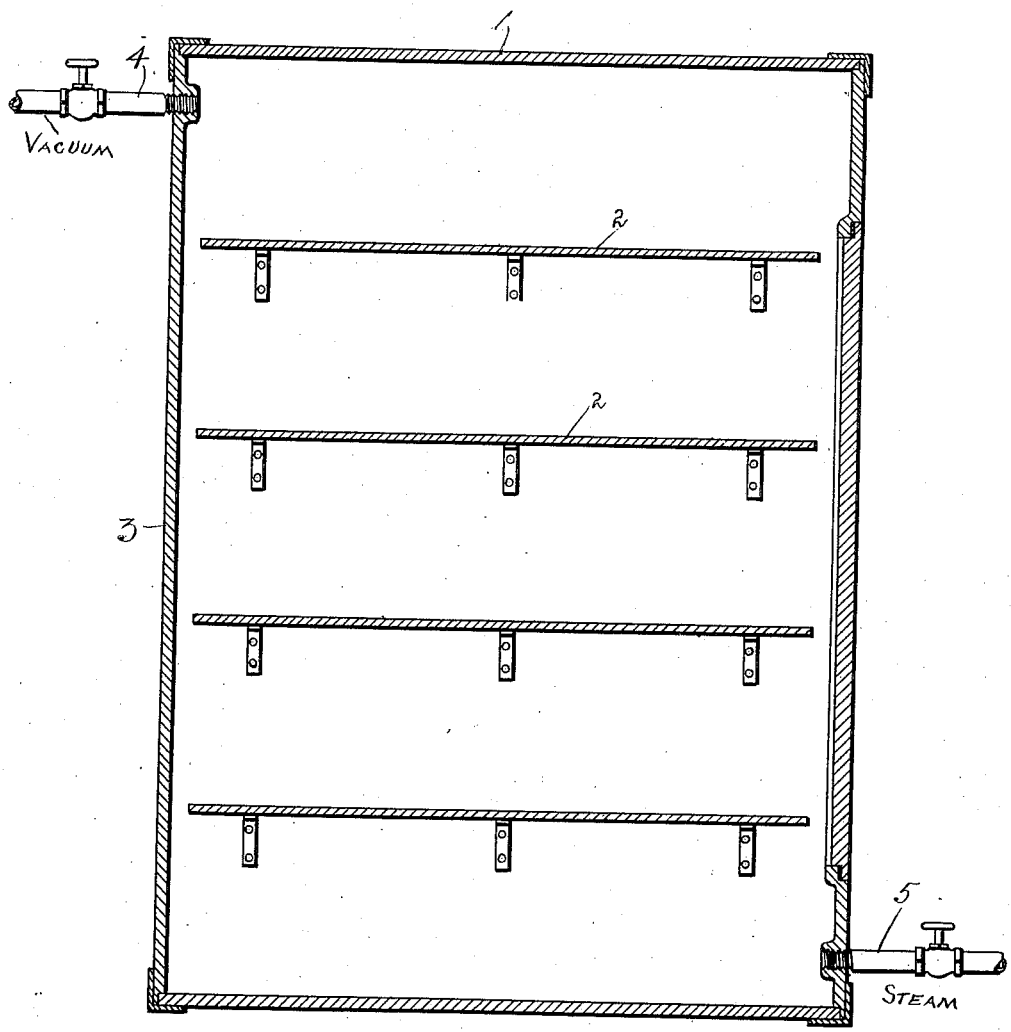

UNITED STATES PATENT OFFICE.

WHARTON B. McLAUGHLIN, OF NEW YORK, N. Y.

METHOD OF PRODUCING FOODSTUFFS.

1,380,489. Specification of Letters Patent. Patented June 7, 1921.

Application filed October 17, 1917, Serial No. 197,162. Renewed November 5, 1920. Serial No. 422,077.

*To all whom it may concern:*

Be it known that I, WHARTON B. MC-LAUGHLIN, a citizen of the United States, and a resident of the city, county, and State of New York, have invented new and useful Improvements in Methods of Producing Foodstuffs, of which the following is a specification.

This invention relates to methods of preserving food stuffs particularly fruits and vegetables of comparatively high fluid content.

Fruits and vegetables have heretofore been preserved by two general methods—dehydrating and canning—both of which present inherent difficulties which have not so far as I am aware been satisfactorily overcome. In dehydrating vegetables the chief difficulty lies in drying them sufficiently to keep without destroying the flavor and rendering them so dry that they cannot be restored by the usual methods of soaking and cooking. Unless the vegetables are very thoroughly dried they will mold and rot particularly in damp climates and on the other hand if sufficiently dried to keep under the usual conditions of transportation and storage it has been found difficult to completely restore the dry vegetables to their original taste and consistency.

When canning processes are properly carried out the vegetables will be preserved so as to retain their food value and when properly cooked the taste of the fresh vegetable is sufficiently restored for the canned food stuffs to be usually satisfactory. Proper canning however is necessarily an expensive process by reason of the large containers required in proportion to the actual food value of the contents due to the fact that the greater majority of fruits and vegetables have as much as ninety per cent. moisture which occupies the greater portion of the container.

I have discovered that vegetables and fruits may be partially dried even to the extent of driving off nine-tenths of their fluid content without in any way impairing the flavor of the product. This is due I believe to the fact that as the fluid is driven off the retained fluid is at first concentrated without actual loss of the ingredients which gives the flavor and if the drying is stopped when a proper degree of concentration is attained the vegetables may be restored to their original condition by the mere addition of water to dilute the concentrated juices.

Such partially dried vegetables will not of course keep except when packed in proper containers and properly sterilized and sealed. The sterilizing of partially dried products of this character presents difficulty not met with in ordinary canning operation and one of the important steps in my improved process is the efficient sterilizing of the material as will be more fully explained hereinafter.

For certain classes of vegetables I require a sterilizing apparatus of special construction which I have illustrated in the accompanying drawing wherein the apparatus is shown in vertical section.

In carrying out my process I first partially dry the vegetables in any improved apparatus for instance that of my co-pending application Serial No. 197,161, filed October 17, 1917, but instead of drying the vegetables to complete dryness in the manner described in that application I stop the drying process and remove the vegetables from the drier when they have been reduced to say one-fourth their normal bulk. The vegetables may, however, be dried by any other method.

In case the vegetables are of unusually high fluid content, such for example as tomatoes, the pieces of dry vegetable will still have sufficient moisture for liquid to be expressed when the vegetables are packed in a container. I take advantage of this property in order to secure the proper sterilization of the material before sealing the containers. The tomatoes will be packed in the containers under pressure sufficiently high to force out enough liquid to surround and cover the solid particles. The closures of the containers are then put on loosely but not sealed and the containers heated to a boiling temperature for sufficient length of time to sterilize the contents. All portions of the solid content will be heated to a sterilizing temperature due to the convection of the liquid within a reasonable time, whereas if the liquid were not expressed from the tomato pieces before heating the heat would have to pass through the portions at the middle of the can solely by conduction which would take such a long time that the portions in contact with the walls of the can would be overcooked and spoiled before the middle was sterilized.

While the contents of the containers are still at a sterilizing temperature the closures are fastened down and hermetically sealed in any improved manner. The process may be successfully carried out with either glass containers of the kind usually employed for household preserving or with commercial metal cans.

The resulting product is not unlike the ordinary canned tomatoes except that each can contains four or five times the actual food content, thus saving in the cost of the containers alone more than sufficient to pay for the additional steps of the process. The chief saving however is in the greater quantity of food which may be shipped and stored at the same cost.

Vegetables of a lower per cent. of fluid content present greater difficulties in sterilizing for the reason that when dried sufficiently to materially reduce their bulk the retained liquid cannot be expressed in sufficient quantity to serve as a medium for conducting the sterilizing heat to the middle of the can. In order to sterilize such vegetables I have devised the apparatus illustrated in the accompanying drawing.

This apparatus consists essentially of a cabinet 1 constructed to be liquid and gas tight and containing a series of shelves 2 or other suitable supports for the cans containing the partially dried vegetables. A door 3 is provided on one side for charging the cabinet. At one corner of the cabinet there is attached a pipe line 4 which is connected to an air pump or other apparatus for exhausting the air from the cabinet to produce a comparatively high vacuum therein. At the opposite corner of the cabinet there is a second pipe line 5 which will be connected to a boiler so that live steam under the desired pressure may be admitted to the cabinet.

In carrying out the process the vegetables will be partially dried in the same manner as heretofore described and will be packed in the can and the cans placed on the shelves 2 of the sterilizing apparatus. After the door 3 is closed and with the steam pipe cut off the exhaust line will be open and the air exhausted from the cabinet and from the cans and their contents. This action has the effect of withdrawing the air from the pores of the vegetables thus creating a condition of sub-normal pressure in the interior of the vegetable pieces. After the cabinet has been exhausted in the manner described the exhaust valve is closed and the steam valve opened allowing the live steam under pressure to enter the cabinet. The exhausted vegetable pieces will absorb the steam which will replace the air exhausted from their pores and the steam will in a short time heat the entire contents of the can to a sterilizing temperature. After the can is sufficiently sterilized and while the contents are still sterile the cans will be closed and hermetically sealed.

In using the product of my improved process it is only necessary to soak the contents of the can in the necessary quantity of water to restore the original fluid content of the vegetables. After this the vegetables may be cooked like any other canned vegetables and are not distinguishable from vegetables canned with their entire fluid content. The expression "vegetables of high water content" used in the claim is intended to include ordinary garden vegetables such as tomatoes, corn, string beans, green peas, etc., which are commonly canned and which contain by weight 60% or more of water.

What I claim is:

The method of packing vegetables of high water content so as to reduce their bulk which consists in partially dehydrating the vegetables to remove the greater portion of the contained water while leaving sufficient water in the vegetables to constitute at least 30% by weight of the partially dehydrated vegetable, then packing the vegetables in containers, exhausting the air from the containers and the contents, then subjecting the contents while exhausted to the action of steam at a sterilizing temperature and hermetically sealing the containers while the contents are sterile.

WHARTON B. McLAUGHLIN.